(12) United States Patent
Hadadi et al.

(10) Patent No.: US 10,945,298 B1
(45) Date of Patent: *Mar. 9, 2021

(54) SYSTEM, METHOD, AND COMPUTER PROGRAM FOR SELECTING A COMMUNICATION NETWORK TO UTILIZE BASED ON KNOWLEDGE AND ARTIFICIAL INTELLIGENCE (AI)

(71) Applicant: Amdocs Development Limited, Limassol (CY)

(72) Inventors: Matan Hadadi, Rishon Le-Zion (IL); Yuval Yakov Mayron, Natanya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,637

(22) Filed: Oct. 29, 2019

Related U.S. Application Data

(63) Continuation of application No. 15/968,579, filed on May 1, 2018, now Pat. No. 10,517,125.

(51) Int. Cl.
  *H04W 76/10* (2018.01)
  *H04L 12/24* (2006.01)
  *H04W 48/16* (2009.01)

(52) U.S. Cl.
  CPC .............. *H04W 76/10* (2018.02); *H04L 41/16* (2013.01); *H04W 48/16* (2013.01)

(58) Field of Classification Search
  CPC ........ H04W 76/10; H04W 48/16; H04L 41/16
  See application file for complete search history.

(56) References Cited

U.S. PATENT DOCUMENTS

| | | | | |
|---|---|---|---|---|
| 8,555,364 | B2* | 10/2013 | Filippi | H04L 63/0272 726/7 |
| 8,860,965 | B2* | 10/2014 | Miyata | G06F 3/1285 358/1.13 |
| 9,270,931 | B2 | 2/2016 | Frankel et al. | |
| 9,603,158 | B1* | 3/2017 | Ross | H04W 24/08 |
| 9,681,260 | B2 | 6/2017 | Bouvigne et al. | |
| 10,517,125 | B1* | 12/2019 | Hadadi | H04L 41/0823 |
| 2006/0098588 | A1 | 5/2006 | Zhang et al. | |

(Continued)

OTHER PUBLICATIONS

Patterson, S.M., "Patents show Google Fi was envisioned before the iPhone was released," Network World, pp. 1-5 as retrieved from https://www.networkworld.com/article/2914833/opensource-subnet/patents-show-google-fi-was-envisioned-before-the-iphone-was-released.html.

*Primary Examiner* — Afshawn M Towfighi
(74) *Attorney, Agent, or Firm* — Zilka-Kotab, P.C.

(57) ABSTRACT

A system, method, and computer program product are provided for selecting a communication network to utilize based on knowledge and at least one artificial intelligence (AI) algorithm. In operation, a user device identifies a plurality of communication networks to which to potentially connect. The user device accesses knowledge associated with the plurality of communication networks to determine a communication network to utilize. The knowledge includes information associated with historical data, present data, and future data. The user device selects the communication network to utilize based on the knowledge and at least one algorithm (e.g. an artificial intelligence algorithm, etc.). Moreover, the user device connects to the communication network for performing at least one activity.

19 Claims, 4 Drawing Sheets

(56) References Cited

U.S. PATENT DOCUMENTS

| | | |
|---|---|---|
| 2008/0062934 A1 | 3/2008 | Zhao |
| 2009/0232088 A1 | 9/2009 | Wisely |
| 2012/0003976 A1 | 1/2012 | Brat et al. |
| 2012/0036035 A1 | 2/2012 | Baluja et al. |
| 2012/0178488 A1 | 7/2012 | Jonker et al. |
| 2014/0228063 A1 | 8/2014 | Harris et al. |
| 2015/0072685 A1 | 3/2015 | Chuang |
| 2015/0119101 A1* | 4/2015 | Cui ................. H04W 48/18 455/525 |
| 2016/0345269 A1* | 11/2016 | Basehore ............ H04W 4/027 |
| 2017/0006517 A1* | 1/2017 | Karimi-Cherkandi ................. H04W 48/16 |
| 2017/0223621 A1 | 8/2017 | Tan et al. |
| 2017/0251440 A1* | 8/2017 | Gilson .................. H04W 4/80 |
| 2017/0339632 A1* | 11/2017 | Miao .................. H04W 48/16 |

\* cited by examiner

SYSTEM, METHOD, AND COMPUTER PROGRAM FOR SELECTING A COMMUNICATION NETWORK TO UTILIZE BASED ON KNOWLEDGE AND ARTIFICIAL INTELLIGENCE (AI)

RELATED APPLICATIONS

The present application is a continuation of U.S. application Ser. No. 15/968,579, filed May 1, 2018, and entitled "SYSTEM, METHOD, AND COMPUTER PROGRAM FOR SELECTING A COMMUNICATION NETWORK TO UTILIZE BASED ON KNOWLEDGE AND ARTIFICIAL INTELLIGENCE (AI)," the entire contents of which is incorporated herein by reference.

FIELD OF THE INVENTION

The present invention relates to a system for selecting a communication network to utilize based on knowledge and at least one artificial intelligence algorithm.

BACKGROUND

Currently, communication devices, such as phones, and computers, etc., select a network to utilize based on only default information or present information. This greatly limits the potential of the communication devices and may lead to unnecessary reduction in quality of service.

There is thus a need for addressing these and/or other issues associated with the prior art.

SUMMARY

A system, method, and computer program product are provided for selecting a communication network to utilize based on knowledge and at least one artificial intelligence (AI) algorithm. In operation, a user device identifies a plurality of communication networks to which to potentially connect. The user device accesses knowledge associated with the plurality of communication networks to determine a communication network to utilize. The knowledge includes information associated with historical data, present data, and future data. The user device selects the communication network to utilize based on the knowledge and at least one algorithm (e.g. an artificial intelligence algorithm, etc.). Moreover, the user device connects to the communication network for performing at least one activity.

DETAILED DESCRIPTION

Figure 1:
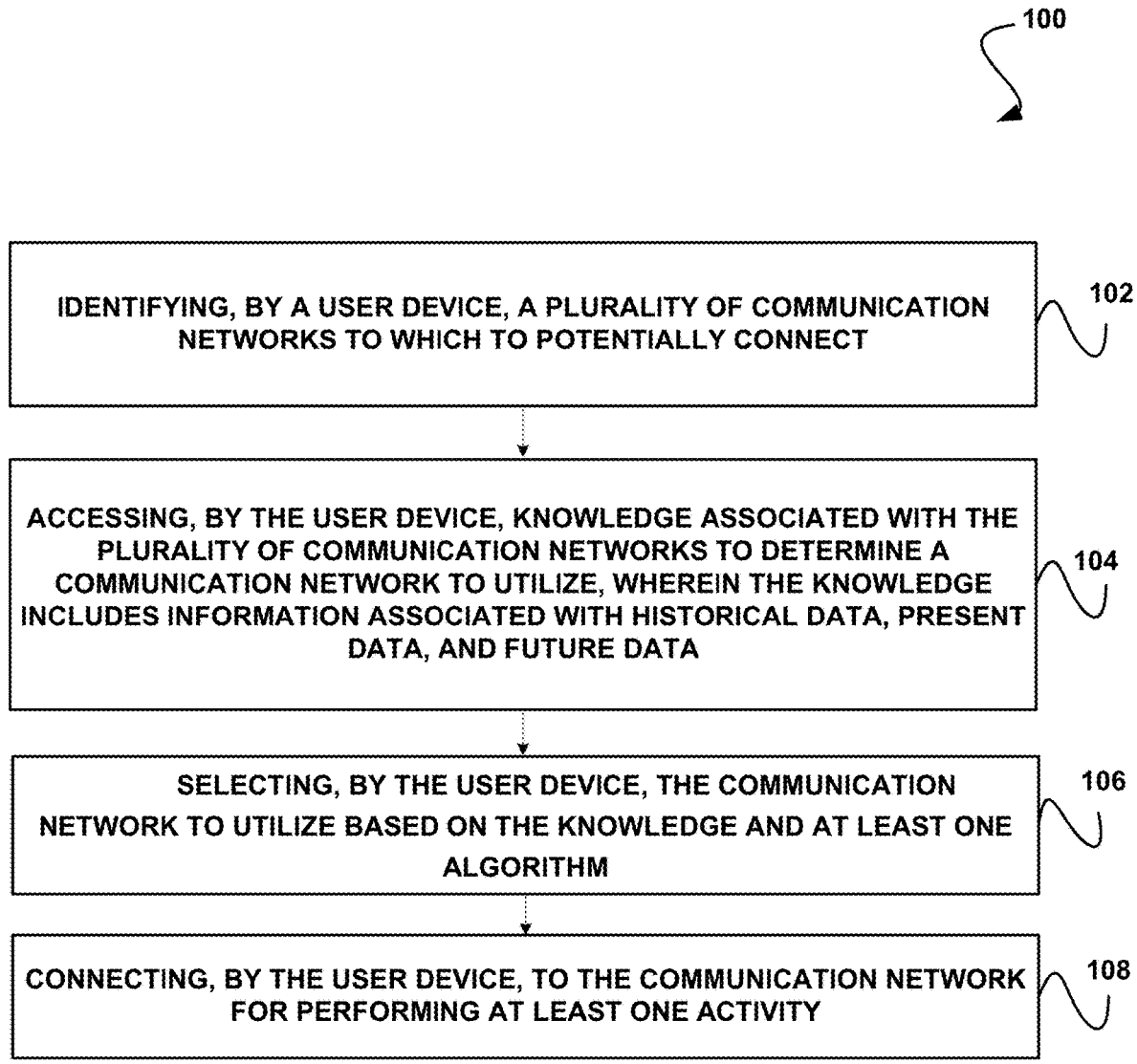
FIG. 1 illustrates a method for selecting a communication network to utilize based on knowledge and at least one artificial intelligence (AI) algorithm, in accordance with one embodiment.

FIG. 1 illustrates a method 100 for selecting a communication network to utilize based on knowledge and at least one artificial intelligence (AI) algorithm, in accordance with one embodiment.

In operation, a user device identifies a plurality of communication networks to which to potentially connect. See operation 102. The user device may include any type of device capable of communication over the network, such as phones, computers, Internet of Things (IoT) devices, etc. The communication networks may include any type of communication network to which a device is capable of utilizing, such as cellular networks (e.g. GSM networks such as 2G/3G/4G/5G, CDMA, etc.), Wi-Fi networks, Bluetooth networks, ZigBee networks, and/or LoRa networks, etc.

The communication networks to which to potentially connect may include a currently accessible network or a network that may be available in the future. The networks may be identified directly by the user device or provided to the device by another device and/or server. For example, another device may share "near future networks" with the user device. As an example, a device may be about to enter an area that in which the device does not know which networks are there (because the device is not physically there and cannot detect them). In this case, a list of networks in the location the device is heading may be either identified from internal data, or provided to the device by a different device/server.

The user device accesses knowledge associated with the plurality of communication networks to determine a communication network to utilize. See operation 104. The knowledge includes information associated with historical data, present data, and future data.

The historical data may include any historical data, such as data associated with at least one of past events information (e.g. past ballgame information, past concert information, etc.), past network information (e.g. past outage or downtime information, etc.), and device history information (e.g. battery usage information, travel information, location information, etc.) etc. The present data may include any present time data, such as at least one of events information (e.g. ballgame information, concert information, etc.), network information (e.g. outage or downtime information, etc.), and device information (e.g. battery usage information, travel information, location information, etc.), etc. The future data may include any future data, such as data associated with at least one of expected events, expected weather, and expected network downtime, expected battery life of the device, etc.

The user device may access the knowledge from a variety of locations. In one embodiment, the user device may access at least a portion of the knowledge from internal memory of the device. In another embodiment, the user device may access at least a portion of the knowledge from another user device. In another embodiment, the user device may access at least a portion of the knowledge from a plurality of devices (e.g. in the same area, etc.). In another embodiment, the user device may access at least a portion of the knowledge from at least one third party system (e.g. such as an alert system, communication service provider system, a website, etc.). In one embodiment, the user device may access the knowledge from some or all of these options.

The user device selects the communication network to utilize based on the knowledge and at least one algorithm (e.g. an artificial intelligence algorithm, etc.). See operation 106. The algorithm may be implemented on the user device or another system and may include any acceptable artificial intelligence algorithm, etc.

In one embodiment, selection of the network to utilize may be based on maximizing or optimizing one or more parameters or status associated with the user device (e.g. according to specific parameters that are relevant for a use case, etc.). Examples of these parameters that may be optimized may include, for example: network quality of service; network speed; network security; network price; network availability; change in a physical location of the device; regulation; business preference; battery saving; and competition needs, etc. In one embodiment, the knowledge shared by other devices and/or requested by the user device may be associated with these parameters to optimize.

Moreover, the user device connects to the communication network for performing at least one activity. See operation 108. The activity may include any communication activity, such as a voice call, Internet usage, or a text message, etc., or any other type of activity (e.g. a service activity, etc.), such as sending an alert, sending applicative sensor data from the device to an external server, etc. The information associated with the selection of the communication network based on the knowledge may be stored for use in a next similar situation, when determining which network to utilize. The algorithm (e.g. the AI algorithm, etc.) may be used to intelligently choose the information to be stored.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
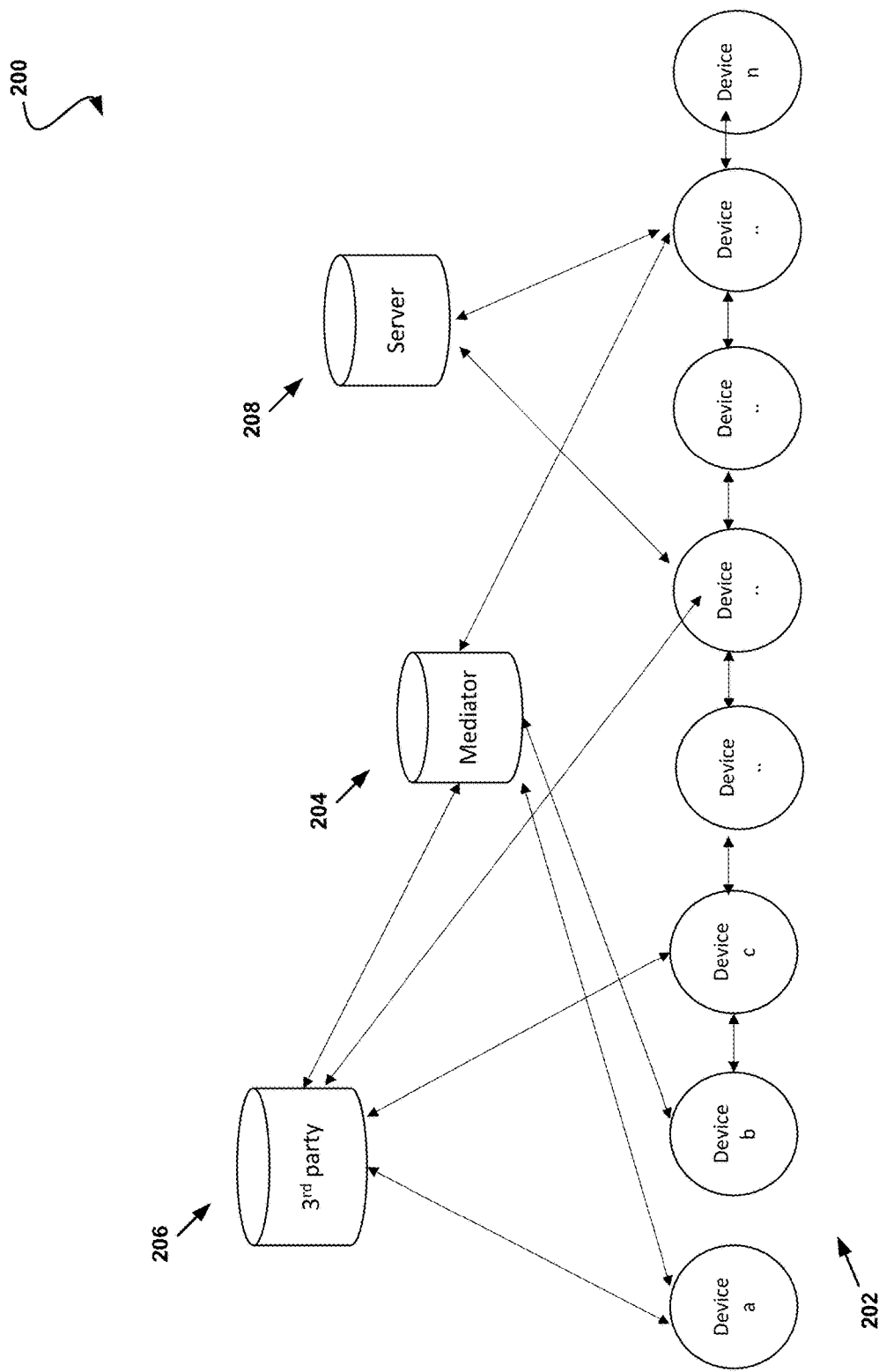
FIG. 2 illustrates a system diagram showing connected devices implementing smart availability using collective AI, in accordance with one embodiment.

FIG. 2 illustrates a system diagram 200 showing connected devices implementing smart availability using collective AI, in accordance with one embodiment. As an option, the system flow diagram 200 may be implemented in the context of the details of the previous figure and/or any subsequent figure(s). Of course, however, the system flow diagram 200 may be implemented in the context of any desired environment. Further, the aforementioned definitions may equally apply to the description below.

As shown, a plurality of devices 202 may be in communication with each other, a mediator system 204, one or more third party systems 206, and/or one or more servers 208.

Using collective artificial intelligence, a connected device can be available 24/7 in the most efficient, economical, and secure way. This means working properly in the best network for that device.

In operation, a device (e.g. one of the plurality of devices 202) may choose a network in which to use based a collective previous knowledge and experience of other devices (e.g. of the plurality of devices 202), in addition to knowledge associated with forecasts of future events and an existing status. The other devices may obtain knowledge/information based on the third party systems 206. This means the devices become smarter in time due to the experience of the device and the experiences of other devices, using AI and/or machine learning techniques. The information from the third party systems 206 may include information such as weather forecasts, network downtime expectations, event information (e.g. games, concerts, rallies, etc.), and/or various other information.

The devices 202 may include any type of device capable of communication, such as phones, computers, IoT devices, etc. The network may include any communication network, such as cellular networks (e.g. GSM: 2G/3G/4G/5G, CDMA), WI-FI networks, Bluetooth networks, ZigBee networks, LoRa networks, etc.

The devices 202 can rely on knowledge (experience) of all other devices to determine a corresponding connectivity approach, such as to which network to connect. The devices 202 may use historical data, present data and future data to help an individual device choose a connectivity approach. The individual device may use the knowledge of other devices to optimize activities, including (but not limited to): sending data to respective servers; receiving data from the servers; and processing the required action on the device, etc.

As an example, a device may use information from other devices to choose between two networks with the same signal strength but where one network has a better historical quality of service (QOS), which is expressed by less disconnections. For example, a customer may arrive at a train station and start a call. The device of the customer may recognize/identify (e.g. from historical data on the device, etc.) the daily route of the customer and determine that soon the device will enter an area with two networks available, network A and network B.

Before reaching the area of network A and network B, the customer device may consult with other devices in the same area regarding which network to connect to, while expressing/sharing with the other devices the parameters that are important for the device (e.g. network QOS is most important, after that network security, etc.). The other devices may share their knowledge with the device. The device may use this information to make a decision to connect to network A or network B (i.e. the best network for that user device based on the given criteria and information from the other devices).

In one embodiment, the other devices may (if needed/configured) make the decision for the device (i.e. indicate to the device to which network to connect and not only share the knowledge).

At the end of this experience, the device may share all relevant network data and information associated with the experience with the other devices that initially shared information with the device (or to any device that requests feedback).

As another example, a device may need to perform a software upgrade at night but there may be an expected downtime due to maintenance on the most secure network. In this case, the device may need a software upgrade, which may be planned for the night to interfere less with customer experience. In this example, the device may have two network possibilities, network A which is less secure, or network B which is more secure (e.g. Wi-Fi versus cellular, etc.). In this example, the device must complete a two hour software upgrade by 5:00 AM but cannot start before 2:30 AM. Network B has a downtime that is expected to end at 2:30 AM.

The device may consult with other devices in the same area regarding which network to connect to while expressing/sharing with the devices any parameters that are important for that device, which in this case is security at the given time. The other devices share any relevant knowledge/information with the device. The device may take this information into account and make a decision as to the best network to connect. In one embodiment, the other devices may instruct the device to connect to a specific network.

At the end of this experience, the device may share all relevant network data and information associated with the experience with the other devices that initially shared information with the device (or to any device that asks for feedback).

A goal of the device may be to maximize a status according to specific parameters that are relevant for a use case. Examples of these parameters that may need to be optimized may include: network QOS; network speed; network security; network price; network availability; change in a physical location of the device; regulation; business preference; battery saving; and competition needs, etc.

The device may use other devices' intelligence to decide to which network to connect. The other devices' intelligence grows with experience and knowledge shared to them. In addition to retrieving knowledge from other devices, the devices may connect to external data sources to retrieve data (such as weather forecasts, network downtime information, etc.). All of this information enables each device to be an intelligence agent, maximizing the success of a given goal.

In one embodiment, an outside operator (e.g. a device administrator) may be able to add knowledge to devices. Additionally, if for some reason the device cannot connect to other devices to help decide to which network to connect, the device may make the decision without external knowledge.

The device or other devices can also make a decision to which network to connect to through an external component (e.g. a server, other device, etc.), which can make the decision. In this case, the external component may also have the AI capabilities and knowledge similar to the device capabilities.

Any of the devices 202 may share knowledge with any other device 202 (e.g. in one embodiment, any other device in which the device is configured to share knowledge, etc.). In various embodiments, the knowledge may be shared directly between the devices or through the mediator 204. This mediator may also be, for example, the server 208, etc. In various embodiments, the server 208 can be physically located in various locations (e.g. and may include a cloud server, physical server, etc.). The communication between the devices 202 and the server 208 and/or the mediator 204 may be through any communication method (e.g. Wi-Fi, cellular, etc.) and use any protocol.

In one embodiment, there may be several mediators (i.e. not only one). This means that mediators can transfer the knowledge between themselves until the knowledge gets to the devices 202.

Once a device receives the knowledge that was shared, the device may run any algorithm or decision process to choose a connectivity strategy and determine to which network to connect. The other devices (that share the information with a given device) may (if needed/desired) make the decision for the device (i.e. tell the device to which network to connect and not only share the knowledge, etc.).

The devices 202, etc., may implement various AI algorithms. Different algorithms can be used for different devices. Further, in one embodiment, depending on the need and the component (e.g. device, server, etc.), a different AI algorithm can be chosen. In addition, depending on the architecture, a different AI algorithm can be chosen to maximize the efficiency of the system 200. One example of an AI algorithm that can be used is the Evolutionary algorithm, which performs well approximating solutions to all types of problems because it ideally does not make any assumption about the underlying fitness landscape.

The devices 202 may store relevant information from network experiences or information from third party systems that has been received. All of the devices 202 may share experiences with other devices (e.g. in one embodiment, if configured with proper permissions, etc.), thus increasing their knowledge.

The devices 202 may store (hold) knowledge either on the device itself (device storage) or on a remote server (for example cloud server). In one embodiment, the devices 202 can make the decision to connect to a particular network based on the information stored locally or information stored on a remote server. In any case the device decision making improves with time as the device and other devices hold more information that helps the device improve network choice.

In one embodiment, the devices 202 may come pre-installed with certain knowledge. This initial state of knowledge can be from any source. This initial knowledge is useful when devices request other devices to share knowledge. For example, in the initial state a device may hold all the knowledge (experience) of other devices similar to the device and associated characteristics.

The device may have a default network in which to connect. This means that even if connectivity of a device to a server is lost, the device will always be able to make a decision to which network to connect. Hence the device may hold a minimal intelligence indicating what to do in certain situations (where to connect in this case). This decision\default network may also derive (and change if needed) from AI knowledge and experience.

A device will use the best way to connect or communicate to any component, based on the information received. This includes but is not limited to, device SDK, OS, APIs, GSM modem, etc.

The system 200 does not need all of the components illustrated in FIG. 2 to function. The system 200 can be deployed with only one device, only one device and a server, multiple devices and no server, multiple devices and one server, or multiple devices and multiple servers, etc.

The system, if needed, will enable the device an easy way to connect to the network. This includes but is not limited to device SDK, OS, and APIs, etc.

The system 200 can be managed through owned servers or with third party cloud servers, etc. The system 200 may provide the components (devices and servers, etc.) the needed means to communicate with each other, through APIs and SDKs, etc. The system 200 may be secured in a way that a component from outside the system cannot affect and fraud the system 200.

In one embodiment, the system 200 may operate such that a device will choose a network based on a self-collected previous knowledge and experience, in addition to using a forecast of future events and existing status. In this case, a device may also obtain knowledge/information from the third party systems 206. This means the devices gets smarter in time due to the experience (using AI basic capabilities).

In this case, the devices 202 may use historical data, present data, and future data to determine a connectivity approach, such as to which network to connect. The devices 202 may do this to optimize activities including (but not limited to): sending data to respective servers, receiving data from the servers; and processing the required action on the device.

As an example, there may be two networks with the same signal strength but one has better historical QOS, which is expressed by less disconnections. For example, a customer may arrive at a train station and start a call. The device may recognize the daily route the customers goes based on historical information and determine that soon the device will enter an area with the two networks available, network A and network B with the same signal strength.

The device will not choose the network randomly. The device will check its historical data and determine that network A QOS is lower from past experience and will choose to connect to network B.

After the device connects to network B, the device will store information associated with this experience (relevant network data) of the connectivity session. The experience details may then be used in future decisions of which network to connect. For example, network B QOS may deteriorate suddenly, which may lead the device in the next same decision point to try network A.

As another example, a device may need to perform a software upgrade at night where a most secure network has an expected downtime due to maintenance. In this case, the device may have two network possibilities, network A which is less secure or network B which is more secure (Wi-Fi vs cellular for example, etc.).

The device must complete the two hour software upgrade before 5:00 AM and must start after 2:30 AM, and network B has a downtime that is expected to end at 2:30 AM. From this information, the device might approve to start the upgrade at 2:45 AM and finish by 4:45 AM. However, based on historical knowledge, the device knows that network B expected downtime always takes more time than reported. For this reason the device may choose to perform the upgrade on the less secure network A. The device will check when the actual downtime of network B ended to factor it into account for the next time the device experiences the same scenario.

The device intelligence grows with experience and knowledge earned. This means that the device learns from past experiences which networks played a better role in improving a status. This may be based on the parameters the device needed to consider according to the use case. Any parameters may be considered, such as, which networks were more reliable, had better QOS, helped maximize battery life, etc.

In addition to the collective information described above, which may be utilized, each device may be independent and hold the needed knowledge in order to operate on its own. The device may connect to external data sources to retrieve data (such as weather forecast, network downtime, etc.). All of this information enables each device to be an intelligent agent, maximizing the success of its given goal.

Thus, using artificial intelligence, connected devices may choose the most optimized network in which to connect. Device knowledge in which the artificial intelligence algorithms may use may come from: previous data (historical), such as events, network information, device history information, etc.; present data; and future data (e.g. expected events, potential to happen events, etc.).

The device can retrieve its data knowledge to help in decision making from: the device's own knowledge (memory); other devices which share the knowledge; third party systems (e.g. weather forecast, websites informing network downtime, etc.); and/or other entities in the network (such as a central server aggregating the different information, etc.).

Figure 3:
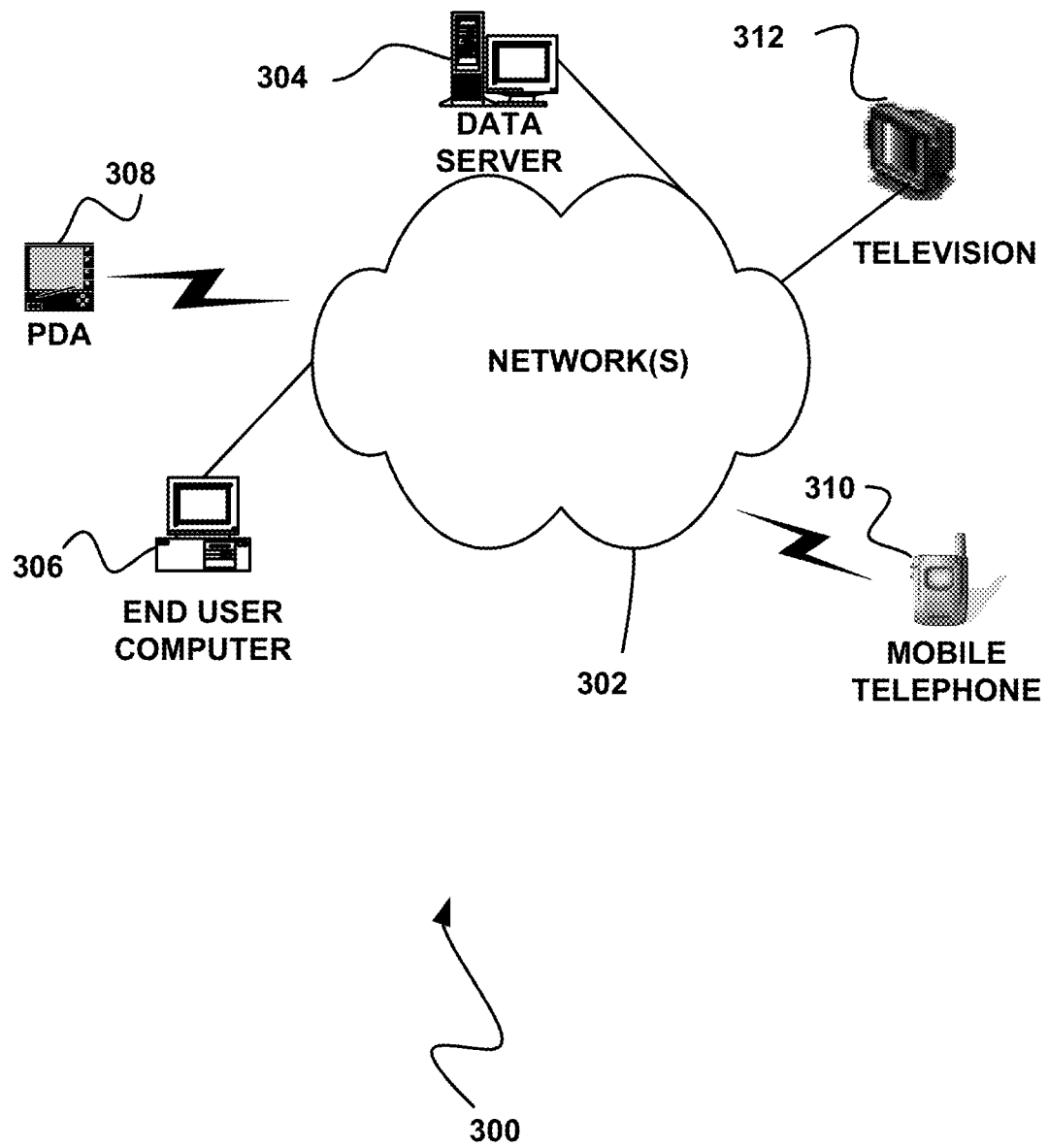
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
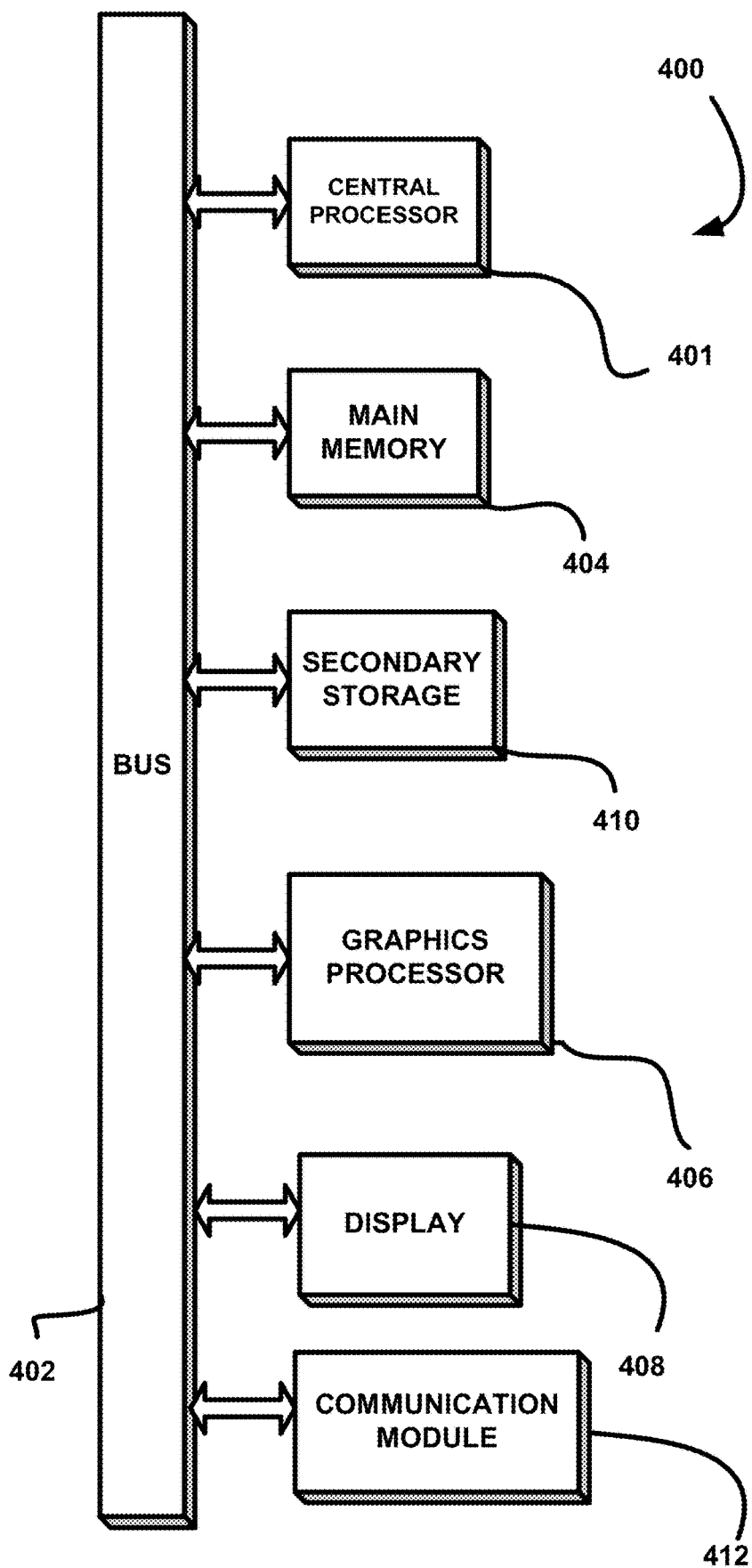
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a user device, a plurality of communication networks to which to potentially connect;
   accessing, by the user device, knowledge associated with the plurality of communication networks to determine a communication network to utilize, wherein the knowledge includes information associated with historical data, present data, and future data, and wherein:
   at least a portion of the knowledge is accessed from another user device located at a location to which the user device is heading, the at least a portion of the knowledge including a list of networks in the location to which the user device is heading;
   selecting, by the user device, the communication network to utilize based on the knowledge and at least one algorithm; and
   connecting, by the user device, to the communication network for performing at least one activity.

2. The method of claim 1, wherein the activity includes at least one of a voice call, Internet usage, a text message, or sending an alert.

3. The method of claim 1, wherein the at least a portion of the knowledge accessed from the other user device further includes previous experiences of the other user device.

4. The method of claim 3, further comprising:
   sharing, with the other user device, information associated with an experience of the user device relevant to the connecting to the communication network.

5. The method of claim 1, wherein the historical data includes at least one of past events information, past network information, and device history information.

6. The method of claim 1, wherein the present data includes at least one of events information, network information, and device information.

7. The method of claim 1, wherein the future data includes at least one of expected events and expected weather.

8. The method of claim 1, wherein the plurality of communication networks include at least one of a cellular network, a Wi-Fi network, and a Bluetooth network.

9. The method of claim 1, wherein information associated with the selection of the communication network based on the knowledge is stored for use in selecting a network to utilize in a next similar situation.

10. The method of claim 1, wherein the communication network to utilize is selected based on optimizing at least one parameter.

11. The method of claim 10, wherein the at least one parameter includes one or more of: network quality of service; network speed; network security; network price; network availability; change in a physical location of the user device; regulation; business preference; battery saving; and competition needs.

12. The method of claim 10, wherein the knowledge accessed by the user device is associated with the at least one parameter to optimize.

13. The method of claim 1, wherein accessing the at least another portion of the knowledge includes:
    consulting with the other user device to obtain the at least another portion of the knowledge from the other user device, including expressing to the other user device one or more parameters to be optimized, and
    receiving, from the other user device, the at least another portion of the knowledge that is relevant to the one or more parameters to be optimized.

14. The method of claim 13, wherein the one or more parameters includes at least one of:
    network quality of service,
    network speed,
    network security,
    network price, and
    network availability.

15. The method of claim 1, wherein an experience of the user device associated with the connecting to the communication network is stored by the user device for use in making one or more future selections of communication networks to utilize.

16. The method of claim 1, wherein at least another portion of the knowledge is accessed from memory of the user device storing past network connection experiences of the user device.

17. The method of claim 16, wherein the memory of the user device is internal memory of the user device.

18. A computer program product embodied on a non-transitory computer readable medium, comprising computer code which when executed by a processor causes the processor to perform a method comprising:
    identifying, by a user device, a plurality of communication networks to which to potentially connect;
    accessing, by the user device, knowledge associated with the plurality of communication networks to determine a communication network to utilize, wherein the knowledge includes information associated with historical data, present data, and future data, and wherein:
    at least a portion of the knowledge is accessed from another user device located at a location to which the user device is heading, the at least a portion of the knowledge including a list of networks in the location to which the user device is heading;
    selecting, by the user device, the communication network to utilize based on the knowledge and at least one algorithm; and
    connecting, by the user device, to the communication network for performing at least one activity.

19. A system, comprising one or more processors, operable for:
    identifying, by a user device, a plurality of communication networks to which to potentially connect;
    accessing, by the user device, knowledge associated with the plurality of communication networks to determine a communication network to utilize, wherein the knowledge includes information associated with historical data, present data, and future data, and wherein:
    at least a portion of the knowledge is accessed from another user device located at a location to which the user device is heading, the at least a portion of the knowledge including a list of networks in the location to which the user device is heading;
    selecting, by the user device, the communication network to utilize based on the knowledge and at least one algorithm; and
    connecting, by the user device, to the communication network for performing at least one activity.

* * * * *